US006673885B1

(12) United States Patent
Shibata et al.

(10) Patent No.: US 6,673,885 B1
(45) Date of Patent: Jan. 6, 2004

(54) PROCESS FOR THE PRODUCTION OF (METH)ACRYLIC POLYMERS

(75) Inventors: Kengo Shibata, Wakayama (JP); Haruya Minou, Wakayama (JP); Haruyuki Sato, Wakayama (JP); Toshinao Ukena, Wakayama (JP); Yoshinao Kono, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/049,521

(22) PCT Filed: Aug. 23, 1999

(86) PCT No.: PCT/JP99/04528
§ 371 (c)(1),
(2), (4) Date: Apr. 15, 2002

(87) PCT Pub. No.: WO01/14438
PCT Pub. Date: Mar. 1, 2001

(51) Int. Cl.⁷ .................................................. C08F 20/10
(52) U.S. Cl. .............................. 526/318.41; 526/318.4; 526/320; 526/328.5; 526/932
(58) Field of Search ......................... 526/318.4, 318.41, 526/320, 328.5, 932

(56) References Cited

U.S. PATENT DOCUMENTS

| | | | | |
|---|---|---|---|---|
| 6,040,473 A | * | 3/2000 | Knebel et al. | 560/217 |
| 6,166,112 A | * | 12/2000 | Hirata et al. | 524/5 |
| 6,174,980 B1 | * | 1/2001 | Hirata et al. | 526/320 |
| 6,265,495 B1 | * | 7/2001 | Hirata et al. | 525/404 |
| 6,294,015 B1 | * | 9/2001 | Yamashita et al. | 106/802 |
| 6,545,083 B1 | * | 4/2003 | Hirata et al. | 524/556 |

FOREIGN PATENT DOCUMENTS

| | | |
|---|---|---|
| CA | 2043525 | 12/1991 |
| JP | 36-20385 | 8/1959 |
| JP | 36-20385 B1 | 10/1961 |
| JP | 48-42473 | 12/1973 |
| JP | 48-42473 B1 | 12/1973 |
| JP | 50-92985 A | 7/1975 |
| JP | 50-92985 | 7/1975 |
| JP | 53-126093 A | 11/1978 |
| JP | 53-126093 | 11/1978 |
| JP | 59-18338 | 4/1984 |
| JP | 1-123813 | 5/1989 |
| JP | 1-123813 A | 5/1989 |
| JP | 5-238795 | 9/1993 |
| JP | 8-12396 | 1/1996 |
| JP | 9-267034 A | 10/1997 |
| JP | 9-267034 | 10/1997 |
| WO | 96/10594 A | 4/1996 |
| WO | WO 96/10594 | 4/1996 |

* cited by examiner

Primary Examiner—Helen L. Pezzuto
(74) Attorney, Agent, or Firm—Birch, Stewart, Kolasch & Birch, LLP

(57) ABSTRACT

Disclosed in the present invention is a process for preparing a (meth)acrylic acid-based polymer having a stable quality and suitable as a dispersant for cement. That is, the present invention provides a process for preparing a (meth)acrylic acid-based polymer, comprising the steps of the stage 1 of introducing (meth)acrylic acid and a polyalkylene glycol monoalkyl ether at a molar ratio in the range of 3:1 to 50:1, subjecting them to an esterification reaction in the presence of an acid catalyst and a polymerization inhibitor and deactivating the acid catalyst with an alkaline agent in order to obtain an esterification product containing a (meth)acrylate and (meth)acrylic acid residues and the stage 2 of copolymerizing the (meth)acrylate and the (meth)acrylic acid residues at a pH value in the range of 1.5 to 3.5.

5 Claims, No Drawings

PROCESS FOR THE PRODUCTION OF (METH)ACRYLIC POLYMERS

This application is the national phase under 35 U.S.C. § 371 of PCT International Application No. PCT/JP99/04528 which has an International filing date of Aug. 23, 1999, which designated the United States of America.

FIELD OF THE INVENTION

The present invention relates to a process for preparing a (meth)acrylic acid-based polymer being useful as a dispersant for cement so as to improve the dispersibility of cement particles in a hydraulic composition such as cement paste, mortar, concrete or the like.

TECHNICAL FIELD

A polycarboxylic acid-based polymer is useful as a dispersant for cement and various techniques in this regard have been proposed. As such dispersants for cement, JP-B 59-18338 discloses a substance comprising a copolymer prepared by reacting a polyalkylene glycol mono (meth)acrylate-based monomer, a (meth)acrylic acid-based monomer, and a monomer capable of reacting with these monomers in specific proportions; JP-A 5-238795 discloses a substance comprising a copolymer prepared by polymerizing an unsaturated bond-bearing polyalkylene glycol diester-based monomer and a monomer having a dissociative group; and JP-A 8-12396 discloses a substance comprising a copolymer of an unsaturated bond-bearing polyalkylene glycol ester monomer and a specific monomer. However, no specific condition for polymerization is described in the above-mentioned prior art and, for example, in JP-A 8-12396, column 4, there is the description that the polymer in this invention can be prepared according to a known process.

DISCLOSURE OF THE INVENTION

The object of the present invention is to provide a process for preparing a (meth)acrylic acid-based polymer which makes it possible to obtain a (meth)acrylic acid-based polymer having a stable quality and suitable as a dispersant for cement by setting the condition for polymerization specifically.

The present inventors have established the invention based on the discovery that the above-mentioned object can be achieved by adding an alkaline agent to an esterification reaction product containing an acid catalyst and a polymerization inhibitor so that the acid catalyst is deactivated and further carrying out a polymerization reaction at a pH value in a specific range.

The invention is a process for preparing a (meth)acrylic acid-based polymer, comprising the steps of the stage 1 of introducing (meth)acrylic acid and a polyalkylene glycol monoalkyl ether at a molar ratio in the range of 3:1 to 50:1, subjecting them to an esterification reaction in the presence of an acid catalyst and a polymerization inhibitor and deactivating the acid catalyst with an alkaline agent in order to obtain an esterification product containing a (meth)acrylate and (meth)acrylic acid residues and the stage 2 of copolymerizing the (meth)acrylate and the (meth)acrylic acid residues at a pH value in the range of 1.5 to 3.5.

A monomer copolymerizable with these monomers may also be present. The (meth)acrylic acid residues include (meth)acrylic acid, an alkali metal salt of (meth)acrylic acid, and an alkaline earth metal salt of (meth)acrylic acid. These salt are formed by the alkaline agent and (meth)acrylic acid when the deactivation by the alkaline agent is carried out.

The monomers at the stage 2 may include the reaction product of the stage 1, the (meth)acrylic acid residues and a newly added monomer. The (meth)acrylate monomer at the stage 2 includes the reaction product of the stage 1 and may further include a newly added monomer. The (meth)acrylic acid may include the residues of the stage 1 and a newly added monomer.

The reaction product of the stage 1 may be subjected directly to the polymerization or may be subjected to the polymerization after the remaining (meth)acrylic acid is distilled off. The polymerization may be carried out by the addition of a monomer. Alternatively, the polymerization may be a combination of these polymerizations. The polymerization is carried out at a pH value in the range of 1.5 to 3.5. The polymerization may be carried out without the addition of acid.

A copolymer having a desired monomer ratio can be obtained by distilling off all or part of unreacted (meth)acrylic acid after the stage 1, but before the stage 2, and/or by copolymerizing a monomer copolymerizable with the (meth) acrylate and/or (meth)acrylic acid residues at the stage 2 wherein two or more kinds of the monomers may be added. That is, the monomers of the polymer include the reaction product of the stage 1 and the monomer added at the stage 2. In the case where unreacted (meth)acrylic acid is distilled off, the (meth)acrylic acid residue after the distillation is taken as the (meth)acrylic acid residue.

At the stage 2, the pH may be adjusted to a value in the range of 1.5 to 3.5 by adding an acid to the esterification reaction product.

At the stage 2, it is preferable that the monomer intended for copolymerization and copolymerizable with the (meth) acrylate and/or (meth)acrylic acid residues is (meth)acrylic acid, methyl (meth)acrylate, or methoxypolyethylene glycol mono (meth)acrylate.

In the present invention, "(meth)acrylic acid" means both acrylic acid and methacrylic acid.

Embodiments of the Implementation of the Invention

At the stage 1, (meth)acrylic acid and a polyalkylene glycol monoalkyl ether are subjected to an esterification reaction in the presence of an acid catalyst and a polymerization inhibitor.

The (meth)acrylic acid for use in the esterification reaction is not particularly limited and, therefore, commercially available (meth)acrylic acid, for example, (meth)acrylic acid containing a polymerization inhibitor, can also be used.

Examples of the polyalkylene glycol monoalkyl ether for use in the esterification reaction include a polyalkylene glycol monoalkyl ether whose polyalkylene portion comprises an alkylene oxide addition product of ethylene oxide alone and a polyalkylene glycol monoalkyl ether whose polyalkylene portion comprises an alkylene oxide addition product of a mixture of ethylene oxide and propylene oxide. The total number of the moles of the alkylene oxide added is preferably 1 to 300. The alkyl group constituting the monoalkyl ether portion is preferably an alkyl group having 1 to 3 carbon atoms. It is possible to use one kind of polyalkylene glycol monoalkyl ether or to use two or more kinds of polyalkylene glycol monoalkyl ethers in which the numbers of moles of alkylene oxide added differ and/or the numbers of the carbon atoms of the alkyl groups differ.

The molar ratio between (meth)acrylic acid and the polyalkylene glycol monoalkyl ether in the reaction system is in the range of 3:1 to 50:1, preferably in the range of 10:1 to 40:1, in order to raise the rate of the esterification reaction.

Examples of the acid catalyst for use in the esterification reaction include sulfonic acids such as p-toluenesulfonic acid, methanesulfonic acid, and benzenesulfonic acid and mineral acids such as sulfuric acid and phosphoric acid.

The amount of the acid catalyst to be used is preferably in the range of 0.1 to 10 parts by weight based on 100 parts by weight of the polyalkylene glycol monoalkyl ether. An amount of 0.1 parts by weight or more makes it possible to maintain a proper reaction rate and an amount of 10 parts by weight or less is economical. Accordingly, the amount's range is preferable because the reaction can be carried out smoothly without cleavage of the alkylene oxide chain of the polyalkylene glycol monoalkyl ether.

Examples of the polymerization inhibitor for use in the esterification reaction include one or a combination in arbitrary ratio of those selected from hydroquinone, benzoquinone, methoquinone, BHT, etc. It is also possible to further raise the effect of polymerization inhibition by the introduction of a gas containing oxygen into the reaction system.

The amount of the polymerization inhibitor to be used is preferably in the range of 0.001 to 1 part by weight based on 100 parts by weight of the polyalkylene glycol monoalkyl ether.

The reaction temperature in the esterification reaction is preferably in the range of 80 to 130° C. A temperature of 80° C. or above makes it possible to maintain a proper reaction rate. A temperature of 130° C. or below makes it possible to prevent the deterioration of the quality of the polyalkylene glycol monoalkyl ether and maintain the viscosity of the reaction system at a proper value. Accordingly the temperature range is preferable.

Although the pressure of the reaction system in the esterification reaction is not particularly limited, a reduced pressure is preferable from the standpoint of removing the water formed in the reaction to the outside of the system by distillation.

At the stage 1, after the completion of the esterification reaction, the acid catalyst is deactivated by the addition of an alkaline agent. Examples of the alkaline agent include alkali metal hydroxides such as sodium hydroxide and potassium hydroxide and alkaline earth metal hydroxides such as calcium hydroxide. The amount of the alkaline agent to be used is preferably in the range of 0.9 to 1.5 times, particularly preferably in the range of 1.0 to 1.3 times, relative to the equivalent of the acid catalyst used.

At the stage 1, the removal of the unreacted (meth)acrylic acid by distillation after the deactivation of the acid catalyst provides an esterification reaction product containing a (meth)acrylate represented by the following general formula (I) as a main component together with a (meth)acrylic acid residue represented by the following general formula (II).

General Formula (I)

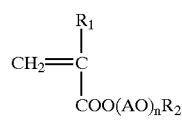

General formula (II)

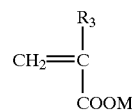

wherein $R_1$ represents a hydrogen atom or a methyl group; $R_2$ represents an alkyl group having 1 to 3 carbon atoms; AO represents an oxyalkylene group having 2 to 3 carbon atoms; n represent a number of 1 to 300; $R_3$ represents a hydrogen atom or a methyl group; and M represents a hydrogen atom, an alkali metal atom, an alkaline earth metal atom, or the like.

In the esterification reaction of the stage 1, a large excess of (meth)acrylic acid is used so that the reaction proceeds smoothly. For this reason, when (meth)acrylic acid is present in an amount exceeding the amount of (meth)acrylic acid required for the stage 2, the unreacted (meth)acrylic acid is distilled off after the stage 1, but before the stage 2. The degree of removal of the unreacted (meth)acrylic acid by distillation is appropriately determined by the molar ratio in the copolymerization between (meth)acrylate and (meth)acrylic acid in the subsequent stage 2.

Examples of the method for removing the unreacted (meth)acrylic acid by distillation include a vacuum distillation method, a steam distillation method, a method in which the unreacted (meth)acrylic acid is distilled off together with a carrier gas, and the like.

At the stage 2, the (meth)acrylate and (meth)acrylic acid residues, which are contained in the esterification reaction product obtained at the stage 1, are subjected to a copolymerization reaction at a pH value in the range of 1.5 to 3.5.

In the copolymerization, a monomer, which is copolymerizable with the (meth)acrylate represented by the general formula (I) and/or (meth)acrylic acid residues, may also be copolymerized. Examples of the monomer include (meth)acrylic acid-based monomers such as acrylic acid, methacrylic acid, crotonic acid, alkali metal salts thereof, alkaline earth metal salts thereof, ammonium salts thereof, and amine salt thereof; unsaturated dicarboxylic acid-based monomers such as maleic anhydride, maleic acid, itaconic anhydride, itaconic acid, citraconic anhydride, citraconic acid, fumaric acid, alkali metal salts thereof, alkaline earth metal salts thereof, ammonium salts thereof, and amine salt thereof; (meth)acrylic acid alkyl esters; (meth)acrylic acid hydroxyalkyl esters; methoxypolyethylene glycol (meth)acrylate; methoxypolypropylene glycol (meth)acrylate; styrene; (meth)acrylamide; acrylonitrile; styrenesulfonic acid and salts thereof; sulfoalkyl (meth)acrylate and salts thereof; and 2-acrylamide-2-methylpropanesulfonic acid and salts thereof. Two or more kinds of the monomers may be copolymerized.

At the stage 2, it is preferable that the monomer, which is to be used for the copolymerization and is copolymerizable with the (meth)acrylate and/or (meth)acrylic acid residues, is (meth)acrylic acid, methyl (meth)acrylate, or methoxypolypropylene glycol mono (meth)acrylate.

The amount to be used of the monomer, which is copolymerizable with the (meth)acrylate and/or (meth)acrylic acid residues, is preferably in the range of 0.3 to 170 parts by weight, particularly preferably in the range of 0.3 to 100 parts by weight, based on 100 parts by weight of the (meth)acrylate represented by the general formula (I).

Although the pH of the reaction system is in the range of 1.5 to 3.5, a pH value in the range of 2.0 to 3.0 is preferable. If the pH is 1.5 or more, the occurrence of a hydrolysis reaction of (meth)acrylate at the time of the polymerization reaction can be inhibited. If the pH is 3.5 or less, the copolymerization rate can be maintained at a high rate and the composition of the monomers in the copolymer can be properly controlled. As a result, a stable-quality (meth)acrylic acid-based polymer useful as a dispersant for cement can be obtained. The pH at the stage 2 is the pH of a 5% by weight aqueous solution of the polymerization reaction mixture.

For the purpose of pH adjustment, it is preferable to add an acid or base when the pH of the esterification reactants is out of the range of 1.5 to 3.5, or, if desired, even when the pH is within this range.

Examples of the acid to be used for the adjustment of pH include phosphoric acid, sulfuric acid, nitric acid, alkylphosphoric acid, alkylsulfuric acid, alkylbenzenesulfonic acid, benzenesulfonic acid, etc. Among these acids, phosphoric acid is preferable because it exhibits a pH-buffering action, easily adjusts the pH to a value in a desired range, and inhibits the foaming of the polymerization reaction system. Examples of the base include sodium hydroxide, potassium hydroxide, etc.

At the stage 2, the reaction can be carried out in the presence of a solvent in order to reduce the viscosity of the polymerization reaction system. Examples of the solvent include water; lower alcohols such as methanol, ethanol, isopropanol, and butanol; aromatic hydrocarbons such as benzene, toluene, and xylene; cycloaliphatic hydrocarbons such as cyclohexane; aliphatic hydrocarbons such as n-hexane; esters such as ethyl acetate; and ketones such as acetone and methyl ethyl ketone. Among these solvents, water and lower alcohol are preferable because of ease in handling and removal by distillation.

In the stage 2, a polymerization initiator may be added. Examples of the polymerization initiator include an organic peroxide, an inorganic peroxide, a nitrile-based compound, an azo-based compound, a diazo-based compound, a sulfinic acid-based compound, etc. The amount of the polymerization initiator to be added is preferably in the range of 1 to 50 molar times relative to the total of the monomer represented by the general formula (I), the monomer represented by the general formula (II), and other monomers.

In the stage 2, a chain-transfer agent may be added. Examples of the chain-transfer agent include a lower-alkylmercaptan, a lower mercaptofatty acid, thioglycerin, thiomalic acid, 2-mercaptoethanol, etc. Particularly when water is used as a solvent, the addition of the chain-transfer agent makes it possible to carry out the adjustment of molecular weight in a more stable manner.

The reaction temperature at the stage 2 is preferably in the range of 0 to 120° C.

The (meth)acrylic acid-based polymer obtained after the treatments of the stage 1 and stage 2 may be subjected to a deodorization treatment, if necessary. Particularly when a thiol such as mercaptoethanol is used as the chain-transfer agent, the deodorizing treatment is desired because an unpleasant odor remains in the polymer.

When a thiol is used as the chain-transfer agent, an example of the deodorization treatment is a process in which the thiol is converted into a disulfide by an oxidizing agent. Examples of the oxidizing agent to be used in this method include hydrogen peroxide, air, oxygen, etc. Among these oxidizing agents, hydrogen peroxide is preferable from the standpoint of the high deodorizing effect by oxidation. The amount of the hydrogen peroxide to be added is preferably in the range of 100 to 2000 ppm, particularly preferably in the range of 100 to 1000 ppm, based on the polymer. An amount of 100 ppm or more makes it possible to carry out a sufficient deodorization treatment. If the amount is 2000 ppm or less, the addition does not cause problems associated with the retention of an excess of hydrogen peroxide. Examples of these problems include the problem that the hydrogen peroxide acts as an initiator to cause the polymerization to proceed; the problem that the hydrogen peroxide is decomposed to generate oxygen; and the problem that the hydrogen peroxide causes the gelation of the polymer solution in a metallic container. The deodorization temperature is preferably in the range of 70 to 100° C. and particularly preferably in the range of 80 to 90° C. The deodorizing effect is raised if the temperature is 70° C. or above and the formation of byproducts due to thermal decomposition of the polymer can be prevented if the temperature is 100° C. or below.

The (meth)acrylic acid-based polymer obtained according to the process of the present invention may be used in the acid state as a dispersant for cement. However, from the standpoint of the inhibition of the ester hydrolysis by the acid, it is preferable that the polymer is converted into a salt by way of neutralization with an alkali. Examples of the alkali include hydroxides of alkali metals or alkaline earth metals, ammonium, alkylammonium, alkanolamine, N-alkyl-substituted polyamine, ethylenediamine, polyethylenepolyamine, etc. When the (meth)acrylic acid-based polymer is used as a dispersant for cement, it is preferable to adjust the pH to a value in the range of 5 to 7 by neutralization.

The weight average molecular weight (gel permeation chromatography, eluent: 0.2 M phosphoric acid buffer (pH 7: $Na_2HPO_4/KH_2PO_4$)/acetonitrile=7/3 (v/v), based on polyethylene oxide) of the (meth)acrylic acid-based polymer obtained according to the process of the present invention is preferably in the range of 10,000 to 200,000, particularly preferably in the range of 20,000 to 100,000, in order to obtain a sufficient dispersing property as a dispersant for cement.

The (meth)acrylic acid-based polymer obtained according to the process of the present invention can be used as a dispersant for hydraulic cement such as Portland cement, alumina cement, and various kinds of mixed cement and a hydraulic material other than cement such as gypsum, etc.

Industrial Applicability

According to the process of the present invention, it is possible to obtain a (meth)acrylic acid-based polymer which has a stable quality and a high-level of cement-dispersing property and is suitable as a dispersant for cement.

EXAMPLES

In the following examples, "%" means "% by weight".

Example 1

(Stage 1)

1000 parts by weight of polyethylene glycol monomethyl ether (weight average molecular weight: 5344), which comprised 120 moles of ethylene oxide added and was melted at 80° C., was charged into a glass reaction vessel fitted with a thermometer, a stirrer, a dropping funnel, a nitrogen inlet pipe, and a cooling condenser. Next, 3 parts by weight of hydroquinone and 32 parts by weight of p-toluenesulfonic acid were added. At this point, 483 parts by weight (an amount that was 30 molar times the amount of the polyethylene glycol monomethyl ether) of methacrylic acid was added, while introducing air at a flow rate equivalent to 6 mL/min per kg of the total weight of the polyethylene glycol monomethyl ether and methacrylic acid into the reaction liquid and introducing nitrogen at a flow rate of 12 mL/min into the vapor phase of the reaction vessel, and heating and pressure reduction of the reaction vessel interior were started. The pressure was controlled to 26.7 kPa. The time point when the temperature of the reaction liquid reached 105° C. was regarded as the reaction-starting time. The temperature of the reaction liquid was maintained at 110° C. by further heating and the reaction was allowed to proceed by distilling off reaction water and methacrylic acid. One hour after the start of the reaction, the pressure was reduced to a value in the range of 12 to 13.3 kPa and thereafter maintained at that value. Six hours after the start of the reaction, the pressure was returned to normal pressure and the reaction liquid was neutralized by the addition of a 48% sodium hydroxide aqueous solution in an amount that was 1.05 times relative to the equivalent of the p-toluenesulfonic acid. In this way, the reaction was completed.

After the completion of the stage 1, while maintaining the temperature of the reaction liquid at 130° C. or below, unreacted methacrylic acid was recovered by vacuum distillation and an esterification reaction product (A)-1 was obtained. The esterification reaction product (A)-1 comprised methacrylate at a concentration of 91.2%, unreacted polyethylene glycol monomethyl ether at a concentration of 2.8%, polymerization inhibitor at a concentration of 0.3%, salt of the catalyst (sodium p-toluenesulfonate) at a concentration of 3.4%, and methacrylic acid residues at a concentration of 2.3%.

(Stage 2)

485 parts by weight of water was charged into the same glass reaction vessel as that of the stage 1 except that the cooling condenser was replaced with a reflux condenser. While the water was stirred, the vapor phase of the reaction vessel was replaced with nitrogen and the temperature of the water was raised to 80 cunderanitrogen atmosphere. Next, three liquids, namely, a solution comprising 600 parts by weight of the esterification reaction product (A)-1, 21 parts by weight of methacrylic acid, 0.7 parts by weight of DIQUEST (phosphonic acid-based chelating agent manufactured by Nihon Monsant Inc.), 5 parts by weight of 85% phosphoric acid, and 400 parts by weight of water all dissolved by mixing, 3 parts by weight of 2-mercaptoethanol, and 39 parts by weight of a 15% ammonium persulfate aqueous solution, were added dropwise simultaneously into the reaction vessel. The dropwise addition of the three liquids was made over a period of 90 minutes. Next, 15 parts by weight of a 15% ammonium persulfate aqueous solution was added dropwise over a period of 30 minutes. After that, aging of the reaction liquid was made for about one hour at 80° C. During the polymerization reaction, dropwise addition, and aging, the pH was 2.5. Further, 30 parts by weight of a 48% sodium hydroxide aqueous solution was added for neutralization. After the neutralization, 0.7 parts by weight of a 35% hydrogen peroxide aqueous solution was added dropwise and the reaction liquid was then aged for one hour at 90° C. In this way, a (meth)acrylic acid-based polymer was obtained. The viscosity of this (meth)acrylic acid-based polymer was found to be 420 mPa·s as a result of measurement (rotor No.2, 30 rpm, B-type viscometer manufacture by Tokyo Keiki Seizosho Co., Ltd.).

By using the (meth)acrylic acid-based polymer thus obtained, a test for assessment as a dispersant for cement was conducted according to the following method. The results are shown in Table 1.

(Measurement of a Paste Flow Value)

0.9 g of a 40% aqueous solution of the (meth)acrylic acid-based polymer was added to 700 g of ordinary Portland cement and 210 g of water. These materials were mixed at 63 rpm for 1 minute and thereafter mixed at 126 rpm for 2 minutes by means of a mortar mixer (manufactured by Sanei Seisakusho Co., Ltd.). After the mixing operation, the mixture was poured into a corn for measuring paste flow (having an upper diameter of 76 mm, a lower diameter of 86 mm, and a height of 40 mm) from the upper opening of the corn while the lower opening of the corn was in a state pressed onto a plane. Next, the corn for the measurement was removed by being pulled up in a direction perpendicular to the plane and two diameters of the cement paste spread in a round shape on the plane were measured. The average of the two diameters was taken as a paste flow value (mm). A paste flow value in the range of 240 to 260 indicates that the dispersibility is excellent.

Example 2

A (meth)acrylic acid-based polymer was obtained in the same way as in Example 1, except that 5 parts by weight of sulfuric acid was used in place of the 5 parts by weight of phosphoric acid at the stage 2 of Example 1. At the stage 2, pH was in the range of 2.2 to 2.8 during the polymerization reaction. The viscosity of the (meth)acrylic acid-based polymer obtained was 450 mPa·s. The paste flow value of this (meth)acrylic acid-based polymer was obtained in accordance with the same method as in Example 1. The results are shown in Table 1.

Example 3

The stage 2 of Example 1 was changed as follows. 485 parts by weight of water was charged into the same glass reaction vessel as that of the stage 1. While the water was stirred, the vapor phase of the reaction vessel was replaced with nitrogen and the temperature of the water was raised to 80° C. under a nitrogen atmosphere. Next, three liquids, namely, a solution comprising 269 parts by weight of the esterification reaction product (A)-1, 76 parts by weight of methacrylic acid, 118 parts by weight of methoxypolyethylene glycol monomethacrylate (manufactured by Shin Nakamura Kagaku Co., Ltd., average molar number of ethylene oxide added: 9), 2 parts by weight of 85% phosphoric acid, and 200 parts by weight of water all dissolved by mixing, 3 parts by weight of 2-mercaptoethanol, and 19 parts by weight of a 15% ammonium persulfate aqueous solution, were added dropwise simultaneously into the reaction vessel. The dropwise addition of the three liquids was made over a period of 90 minutes. Next, 9 parts by weight of a 15% ammonium persulfate aqueous solution was added over a period of 30 minutes. After that, aging of the reaction liquid was made for one hour at 80° C. During the polymerization reaction, the pH was 2.6. Further, 34 parts by weight of a 48% sodium hydroxide aqueous solution was added for neutralization. After the neutralization, 0.7 parts by weight of a 35% hydrogen peroxide aqueous solution was added dropwise and the reaction liquid was then aged for one hour at 90° C. In this way, a (meth)acrylic acid-based polymer was obtained. The viscosity of this (meth)acrylic acid-based polymer was 380 mPa·s. The paste flow value of this (meth)acrylic acid-based polymer was obtained in accordance with the same method as in Example 1. The results are shown in Table 1.

Example 4

The stage 2 of Example 1 was changed as follows. 485 parts by weight of water was charged into the same glass reaction vessel as that of the stage 1. While the water was stirred, the vapor phase of the reaction vessel was replaced with nitrogen and the temperature of the water was raised to 80° C. under a nitrogen atmosphere. Next, three liquids, namely, a solution comprising 600 parts by weight of the esterification reaction product (A)-1, 3.6 parts by weight of methacrylic acid, 61 parts by weight of methyl acrylate, 2.5 parts by weight of 85% phosphoric acid, and 400 parts by weight of water all dissolved by mixing, 3 parts by weight of 2-mercaptoethanol, and 46 parts by weight of a 15% ammonium persulfate aqueous solution, were added dropwise simultaneously into the reaction vessel. The dropwise addition of the three liquids was made over a period of 90 minutes. Next, 15 parts by weight of a 15% ammonium persulfate aqueous solution was added over a period of 30 minutes. After that, aging of the reaction liquid was made for one hour at 80° C. During the polymerization reaction, the pH was 3.0. Further, 15 parts by weight of a 48% sodium hydroxide aqueous solution was added for neutralization. In this way, a (meth)acrylic acid-based polymer was obtained. The viscosity of this (meth)acrylic acid-based polymer was 450 mPa·s. The paste flow value of this (meth)acrylic acid-based polymer was obtained in accordance with the same method as in Example 1. The results are shown in Table 1.

Example 5

(Stage 1)

An esterification reaction product (A)-2 was obtained in the same way as in Example 1, except that 1000 parts by weight of polyethylene glycol monomethyl ether (average molar number of ethylene oxide added: 200, weight average molecular weight: 8864) and 291 parts by weight of methacrylic acid were used. This esterification reaction product (A)-2 comprised methacrylate at a concentration of 90.5%, unreacted polyethylene glycol monomethyl ether at a concentration of 2.7%, polymerization inhibitor at a concentration of 0.3%, salt of the catalyst (sodium p-toluenesulfonate) at a concentration of 3.0%, and methacrylic acid residues at a concentration of 3.5%.
(Stage 2)

A (meth)acrylic acid-based polymer was obtained in the same way as in Example 1, except that the esterification reaction product (A)-2 was used and the 21 parts by weight of methacrylic acid was not added at the stage 2 of Example 1. During the polymerization reaction at the stage 2, the pH was 3.1. The viscosity of the (meth)acrylic acid-based polymer obtained was 455 mPa·s. The paste flow value of this (meth)acrylic acid-based polymer was obtained in accordance with the same method as in Example 1. The results are shown in Table 1.

Example 6

(Stage 1)

An esterification reaction product (A)-3 was obtained in the same way as in Example 1, except that 1000 parts by weight of polyethylene glycol monomethyl ether at the stage 1 of example 1 (average molar number of ethylene oxide added: 9, weight average molecular weight: 429), 1200 parts by weight of methacrylic acid, and 40 parts by weight of p-toluenesulfonic acid were used. This esterification reaction product (A)-3 comprised methacrylate at a concentration of 91.5%, unreacted polyethylene glycol monomethyl ether at a concentration of 2.4%, polymerization inhibitor at a concentration of 0.2%, salt of the catalyst (sodium p-toluenesulfonate) at a concentration of 3.4%, and methacrylic acid residues at a concentration of 2.5%.
(Stage 2)

546 parts by weight of water was charged into the same glass reaction vessel as that of the stage 1. While the water was stirred, the vapor phase of the reaction vessel was replaced with nitrogen and the temperature of the water was raised to 80° C. under a nitrogen atmosphere. Next, three liquids, namely, a solution comprising 585 parts by weight of the esterification reaction product (A)-3, 158 parts by weight of methacrylic acid, and 550 parts by weight of water all dissolved by mixing, 4 parts by weight of 2-mercaptoethanol, and 19 parts by weight of a 15% ammonium persulfate aqueous solution, were added dropwise simultaneously into the reaction vessel. The dropwise addition of the three liquids was made over a period of 90 minutes. Next, 5 parts by weight of a 15% ammonium persulfate aqueous solution was added over a period of 30 minutes. After that, aging of the reaction liquid was made for one hour at 80° C. During the polymerization reaction, the pH was 2.8. Further, 116 parts by weight of a 48% sodium hydroxide aqueous solution was added for neutralization. In this way, a (meth)acrylic acid-based polymer was obtained. The viscosity of this (meth)acrylic acid-based polymer was 320 mPa·s. The paste flow value of this (meth)acrylic acid-based polymer was obtained in accordance with the same method as in Example 1. The results are shown in Table 1.

Comparative Example 1

A (meth)acrylic acid-based polymer was obtained in the same way as in Example 1, except that 16 parts by weight of a 48% sodium hydroxide aqueous solution was used in place of the 5 parts by weight of 85% phosphoric acid at the stage 2 of Example 1. During the polymerization reaction at the stage 2, pH was 4.4. The viscosity of the (meth)acrylic acid-based polymer obtained was 480 mPa·s. The paste flow value of this (meth)acrylic acid-based polymer was obtained in accordance with the same method as in Example 1. The results are shown in Table 1.

Comparative Example 2

A (meth)acrylic acid-based polymer was obtained in the same way as in Example 5, except that the 5 parts by weight of 85% phosphoric acid was not used at the stage 2 of Example 5. During the polymerization reaction at the stage 2, pH was 4.1. The viscosity of the (meth)acrylic acid-based polymer obtained was 500 mPa·s. The paste flow value of this (meth)acrylic acid-based polymer was obtained in accordance with the same method as in Example 1. The results are shown in Table 1.

TABLE 1

| | | | Example | | | | | | Comparative Example | |
|---|---|---|---|---|---|---|---|---|---|---|
| | | 1 | 2 | 3 | 4 | 5 | 6 | 1 | 2 |
| esterification reaction product*1 | | (A)-1 | (A)-1 | (A)-1 | (A)-1 | (A)-2 | (A)-3 | (A)-1 | (A)-2 |
| | | 600 | 600 | 269 | 600 | 600 | 585 | 600 | 600 |
| kinds of monomer*1 | methacrylic acid | 21 | 21 | 76 | 3.6 | | 158 | 21 | |
| | methoxypolyethylene glycol monomethacrylate | | | 118 | | | | | |
| | methyl methacrylate | | | | | 61 | | | |
| pH adjusting agent *1 | 85% phosphoric acid | 5 | | 2 | 2.5 | 5 | | | |
| | sulfuric acid | | 5 | | | | | | |
| | 48% sodium hydroxide | | | | | | | 16 | |
| pH during polymerization reaction | | 2.5 | 2.2–2.8 | 2.6 | 3 | 3.1 | 2.8 | 4.4 | 4.1 |
| viscosity of polymer (mPa·s) | | 420 | 450 | 380 | 450 | 455 | 320 | 480 | 500 |
| paste flow value (mm) | | 250 | 248 | 245 | 243 | 240 | 245 | 175 | 188 |

*1: indicated by parts by weight

All of the (meth)acrylic acid-based polymers obtained in accordance with the manufacturing processes described in Examples 1 to 5 gave high paste flow values. As a result, it was confirmed that high-quality dispersants for cement could be provided.

In contrast, the (meth)acrylic acid-based polymers obtained in accordance with the manufacturing processes described in Comparative Examples 1 and 2 gave very poor paste flow values because the pH of the reaction system at the stage 2 fell outside the range specified in the present invention. Accordingly, it was confirmed that the manufacturing processes different from those of the present invention gave (meth)acrylic acid-based polymers having low paste flow values and, therefore, high-quality dispersants for cement could not be provided.

What is claimed is:

1. A process for preparing a (meth)acrylic acid-based polymer, comprising the steps of the stage 1 of introducing (meth)acrylic acid and a polyalkylene glycol monoalkyl ether at a molar ratio in the range of 3:1 to 50:1, subjecting them to an esterification reaction in the presence of an acid catalyst and a polymerization inhibitor and deactivating the acid catalyst with an alkaline agent in order to obtain an esterification product containing a (meth)acrylate and (meth)acrylic acid residues and the stage 2 of copolymerizing the (meth)acrylate and the (meth)acrylic acid residues at a pH value in the range of 1.5 to 3.5.

2. The process according to claim 1, wherein the copolymer having a desired monomer ratio is obtained by distilling off unreacted (meth)acrylic acid after the stage 1, but before the stage 2, and/or by copolymerizing a monomer copolymerizable with the (meth)acrylate and/or (meth)acrylic acid residues at the stage 2.

3. The process according to claim 1 or 2, wherein the pH is adjusted to a value in the range of 1.5 to 3.5 by adding an acid to the esterification reaction product at the stage 2.

4. The process according to claim 3, wherein the acid is phosphoric acid.

5. The process according to claim 2, wherein the monomer copolymerizable with the (meth)acrylate and/or (meth) acrylic acid residues to copolymerize at the stage 2 is (meth)acrylic acid, methyl (meth)acrylate or methoxypolyethylene glycol mono(meth)acrylate.

* * * * *